(12) United States Patent
Basavarajaiah et al.

(10) Patent No.: US 10,355,861 B2
(45) Date of Patent: Jul. 16, 2019

(54) CHASSIS-BASED CRYPTOGRAPHIC AFFINITIES

(71) Applicant: DELL PRODUCTS, LP, Round Rock, TX (US)

(72) Inventors: Sushma Basavarajaiah, Bangalore (IN); Rama R. Bisa, Bangalore (IN); Chitrak Gupta, Bangalore (IN); Mukund P. Khatri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 164 days.

(21) Appl. No.: 15/471,818

(22) Filed: Mar. 28, 2017

(65) Prior Publication Data

US 2018/0287791 A1    Oct. 4, 2018

(51) Int. Cl.
*H04L 29/06* (2006.01)
*H04L 9/08* (2006.01)
*H04L 9/32* (2006.01)

(52) U.S. Cl.
CPC ............ *H04L 9/0866* (2013.01); *H04L 9/083* (2013.01); *H04L 9/3236* (2013.01); *H04L 63/04* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,970,143 B2 | 6/2011 | Vennelakanti et al. | |
| 9,218,301 B2 | 12/2015 | Gupta et al. | |
| 2007/0083723 A1* | 4/2007 | Dey | G06F 11/2033 711/163 |
| 2008/0301468 A1 | 12/2008 | Murase et al. | |
| 2013/0177157 A1* | 7/2013 | Li | H04L 9/083 380/277 |

* cited by examiner

*Primary Examiner* — Andrew J Steinle
(74) *Attorney, Agent, or Firm* — Larson Newman, LLP

(57) ABSTRACT

Cryptographic affinities are generated to improve security in data centers. When a blade server is hot swapped, the cryptographic affinities protect electronic data stored within the blade server. The cryptographic affinities are generated based on hashing a unique chassis identifier. If the blade server is installed in a different chassis, the cryptographic affinities lock out the different chassis from read, write, and other access operations. The cryptographic affinities may even require deleting or reformatting before rekeying is commenced.

17 Claims, 12 Drawing Sheets

CHASSIS-BASED CRYPTOGRAPHIC AFFINITIES

FIELD OF THE DISCLOSURE

The present disclosure generally relates to information handling systems, and more particularly relates to chassis-based cryptographic affinities.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Exemplary embodiments add security in data centers. Cryptographic signatures may be based on individual blade servers installed in a single chassis. That is, a cryptographic affinity may be generated for the individual blade servers installed in a single chassis. If any one of the blade servers is removed from the chassis and reinstalled in a different chassis, the cryptographic affinity prevents access from the different chassis. Individual blade servers, in other words, may be cryptographically tied or married to a particular chassis. Exemplary embodiments may also be applied to groups of chassis and even to a data center.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
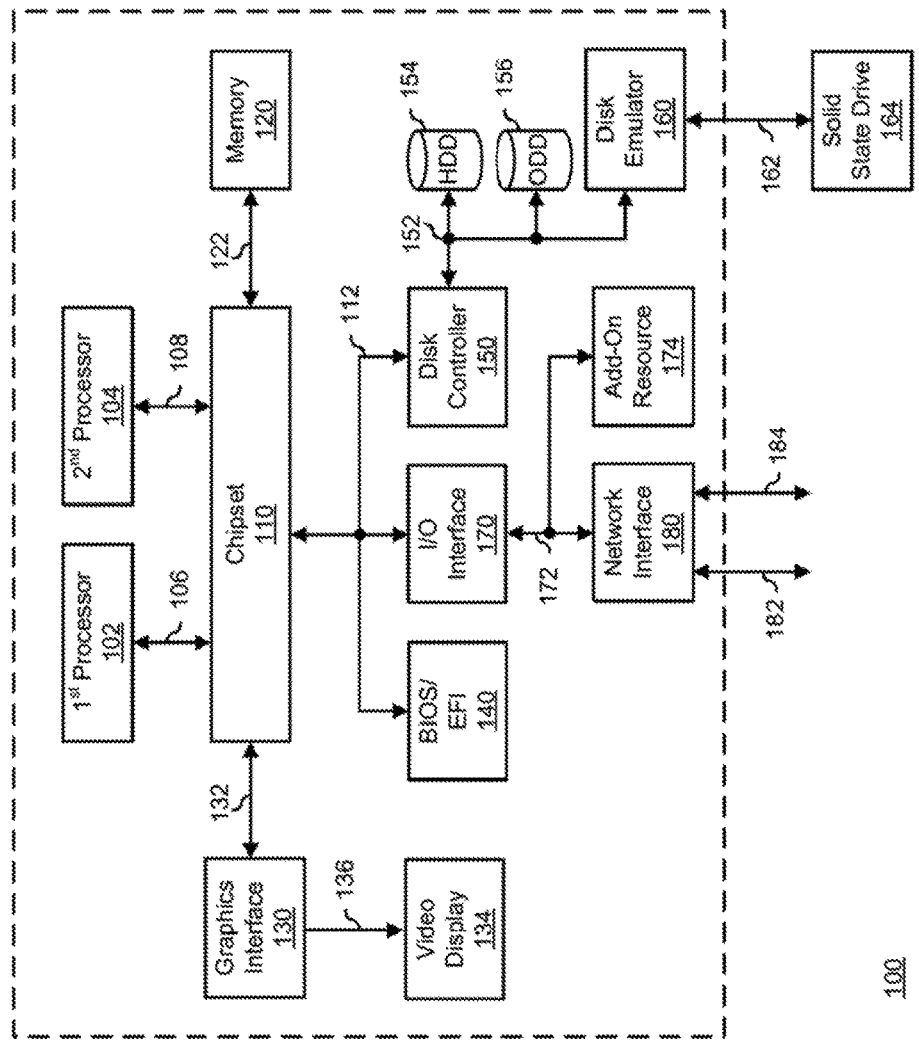
FIG. 1 is a block diagram illustrating an information handling system according to an embodiment of the present disclosure.
Figure 2:
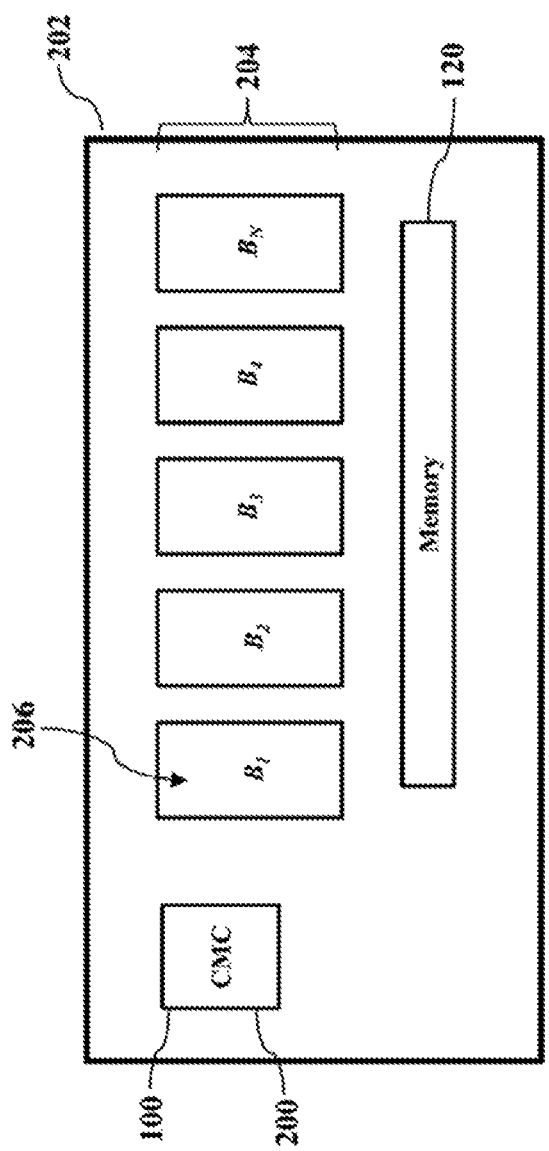
FIGS. 2-6 are simplified illustrations of cryptographic affinities, according to exemplary embodiments.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

FIGS. 2-6 are simplified illustrations of cryptographic affinities, according to exemplary embodiments. Here the information handling system 100 may be configured as a chassis management controller (or "CMC") 200 operating within a common, single chassis 202 that houses several different blade servers 204 (textually illustrated as $B_{1-N}$). As the reader may understand, blade servers are very common in data centers. Each blade server 204 stores electronic data 206. The chassis 202 may provide a common power supply, but each blade server 204 has its own CPU, a service processor, RAM, and other memory storage. The chassis management controller 200 manages the blade servers 204. Enterprise blade servers are generally well known, so this disclosure need not review the known details.

Figure 3:
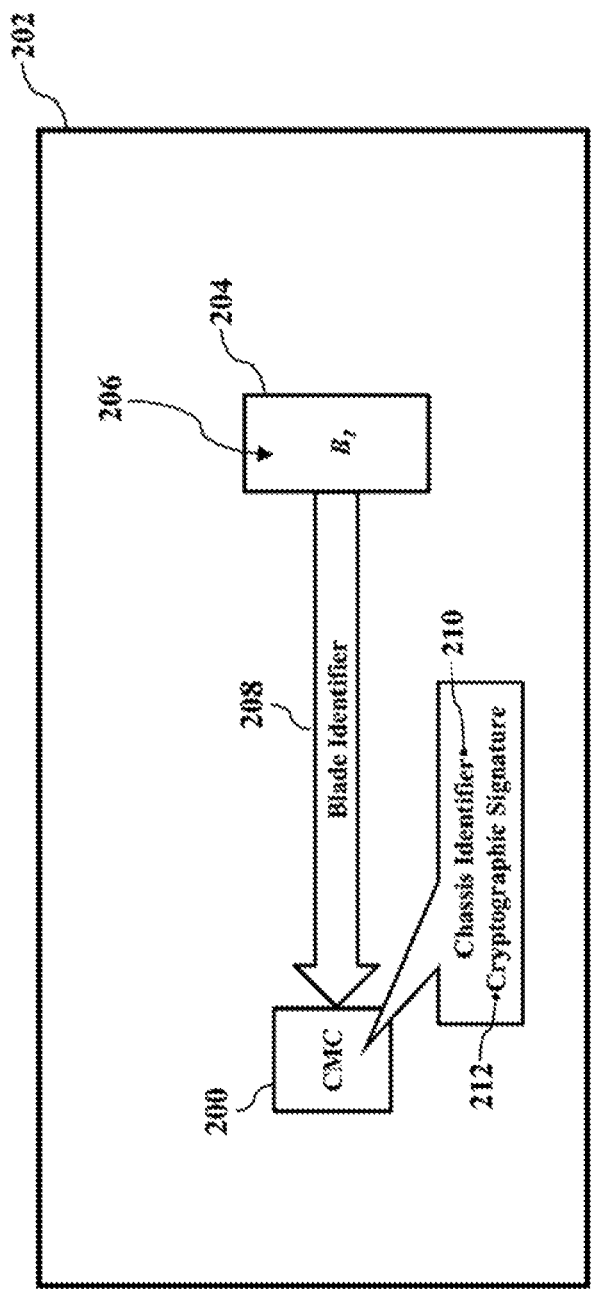

FIG. 3 illustrates chassis-based cryptographic security. When the blade server 204 is installed in the chassis 202, the blade server 204 establishes communication with the chassis management controller 200. The blade server 204 sends a blade identifier 208 to the chassis management controller 200. The blade identifier 208 is an alphanumeric combination that uniquely identifies the corresponding blade server 204. The chassis management controller 200 also retrieves an alphanumeric chassis identifier 210 that uniquely identifies the chassis management controller 200 and/or the chassis 202. The chassis management controller 200 may then hash the blade identifier 208 and the chassis identifier 210 to generate a cryptographic signature 212. The chassis management controller 200 may then store the cryptographic signature 212 to authorize, or to deny, access to the electronic data 206 stored by the blade server 204.

Figure 4:
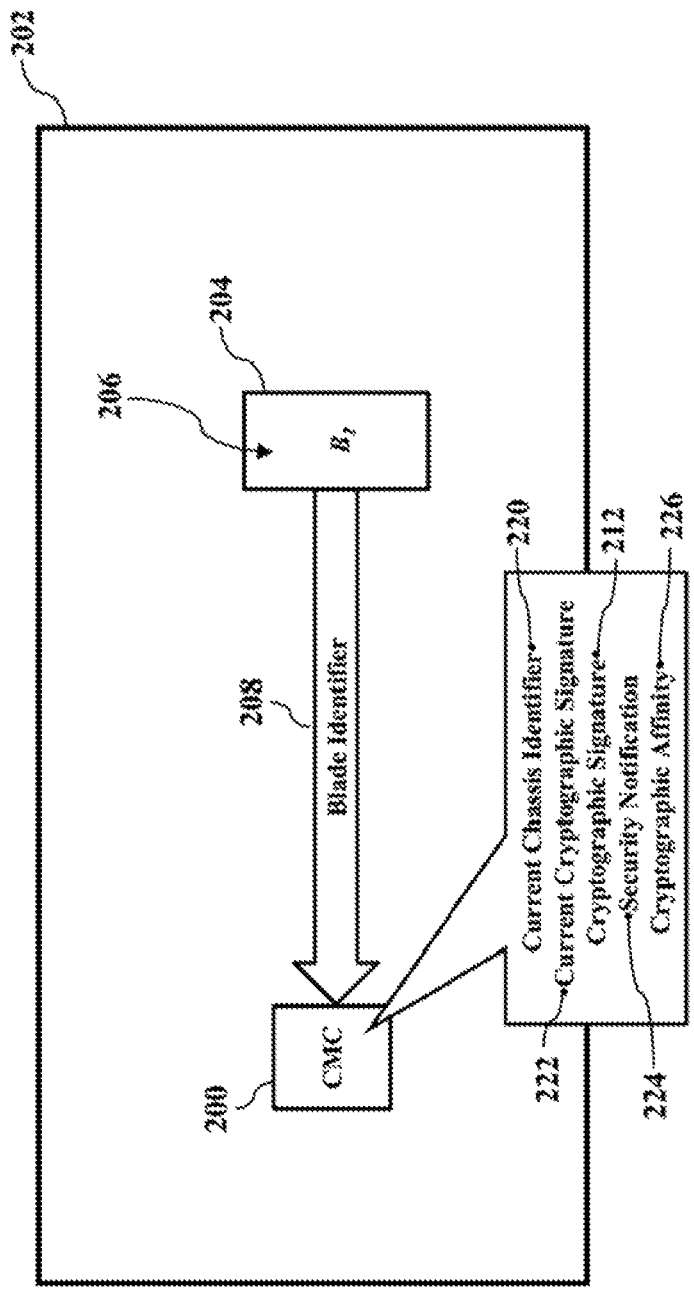

FIG. 4 illustrates data access. Whenever exemplary embodiments read from, write to, or otherwise access the blade server 204, exemplary embodiments may verify the cryptographic signature 212. That is, the chassis management controller 200 may recalculate and/or compare the cryptographic signature 212 to current hash values to ensure the blade server 204 is installed within the same chassis 202. That is, at any time, the chassis management controller 200 may query the blade server 204 for its blade identifier 208. The chassis management controller 200 may also retrieve a current chassis identifier 220 associated with the chassis 202 of installation. The chassis management controller 200 generates a current cryptographic signature 222 by hashing the blade identifier 208 and the current chassis identifier 220. The chassis management controller 200 may then compare the current cryptographic signature 222 with the cryptographic signature 212 previously generated. If a match is determined, then the chassis management controller 200 and/or the blade server 204 permits access to the internally stored electronic data 206. However, if the current cryptographic signature 220 fails to match the cryptographic signature 212, then exemplary embodiments may infer that the blade server 204 has been moved and installed in an unauthorized chassis. The current chassis identifier 220, in other words, has changed. Exemplary embodiments may thus deny access to the internally stored electronic data 206 and even generate a security notification 224.

Exemplary embodiments thus present an elegant security solution. Once the blade server 204 is initially cryptographically keyed to the chassis identifier 210, the cryptographic signature 212 may be a master key for all future use. Exemplary embodiments thus generate a cryptographic affinity 226 between the blade server 204 and the chassis 202. As the reader may envision, the privacy and security of the electronic data 206 is very important. However, the blade server 204 may be easily removed from the chassis 202, perhaps compromising the electronic data 206. Indeed, if a rogue entity were to steal the blade server 204, the rogue entity could merely reinstalled the blade server 204 in a different chassis and read its electronic data 206. Exemplary embodiments, though, lockout the blade server 204 from a strange or unknown chassis. A different chassis will have a different chassis identifier 210. If the chassis identifier 210 changes, then the current cryptographic signature 212 will not match the master cryptographic signature 212 required for access. A strange or unauthorized chassis, in plain words, cannot access the electronic data 206 that is internally stored within the blade server 204. The blade server 204 may thus refuse to read, write, or otherwise provide access.

Figure 5:
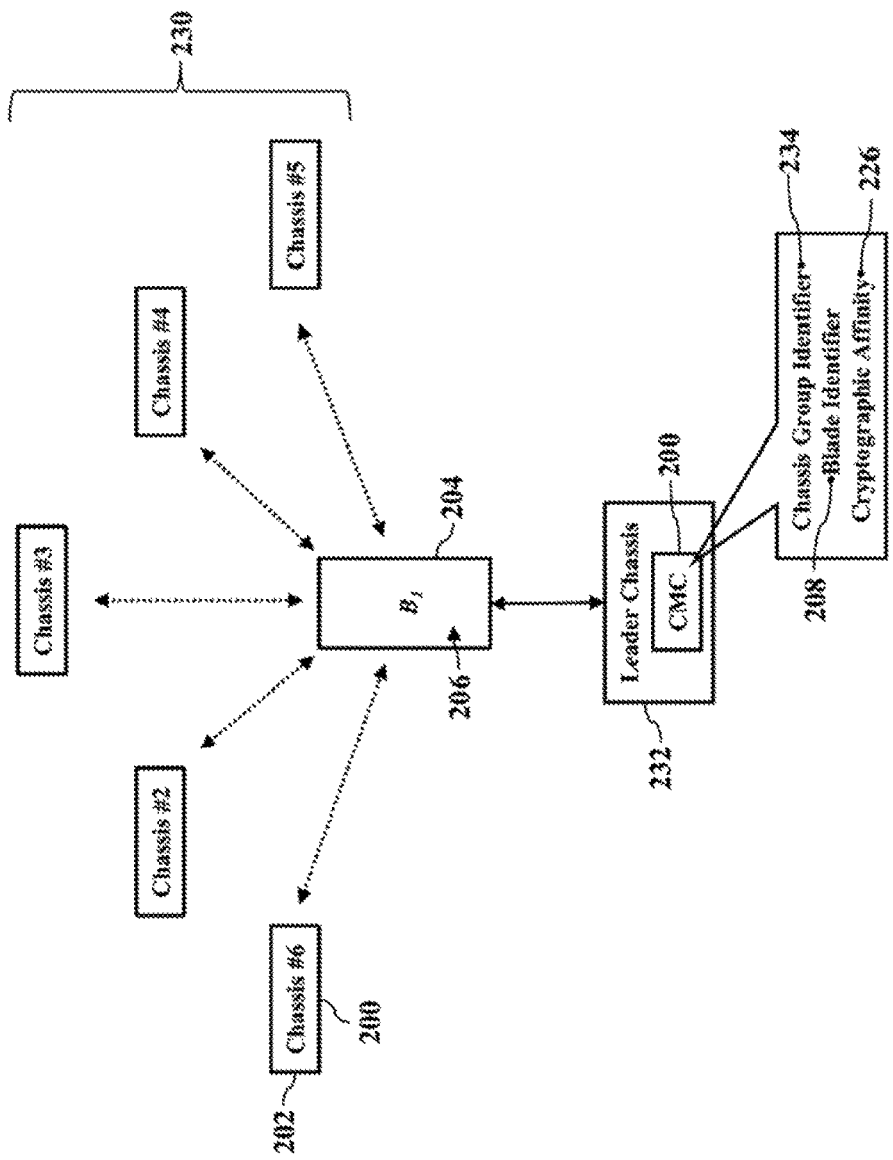

FIG. 5 extends exemplary embodiments. Here the blade server 204 may be have the cryptographic affinity 226 to a group 230 of chassis. That is, the blade server 204 may be cryptographically keyed to any one of the different chassis 202 in the group 230 of chassis. Here exemplary embodiments may designate a leader chassis 232 in the group 230 of chassis. The leader chassis 232 may be authorized to generate the cryptographic affinity 226. The chassis management controller 200 operating in the leader chassis 232 retrieves a chassis group identifier 234 associated with the group 230 of chassis. The chassis group identifier 234 is an alphanumeric combination that uniquely identifies the group 230 of chassis. The chassis management controller 200 may then hash the blade identifier 208 and the chassis group identifier 234 to generate the cryptographic affinity 226. Whenever the blade server 204 operates, exemplary embodiments may recalculate and check the cryptographic affinity 226. If the cryptographic affinity 226 matches, then the blade server 204 is installed within the correct group 230 of chassis. However, if the blade server 204 is installed within an unauthorized cluster or group, then the cryptographic affinity 226 will not match and exemplary embodiments may deny access to the electronic data 206. Exemplary embodiments may thus lock out the blade server 204 to protect the electronic data 206.

Figure 6:
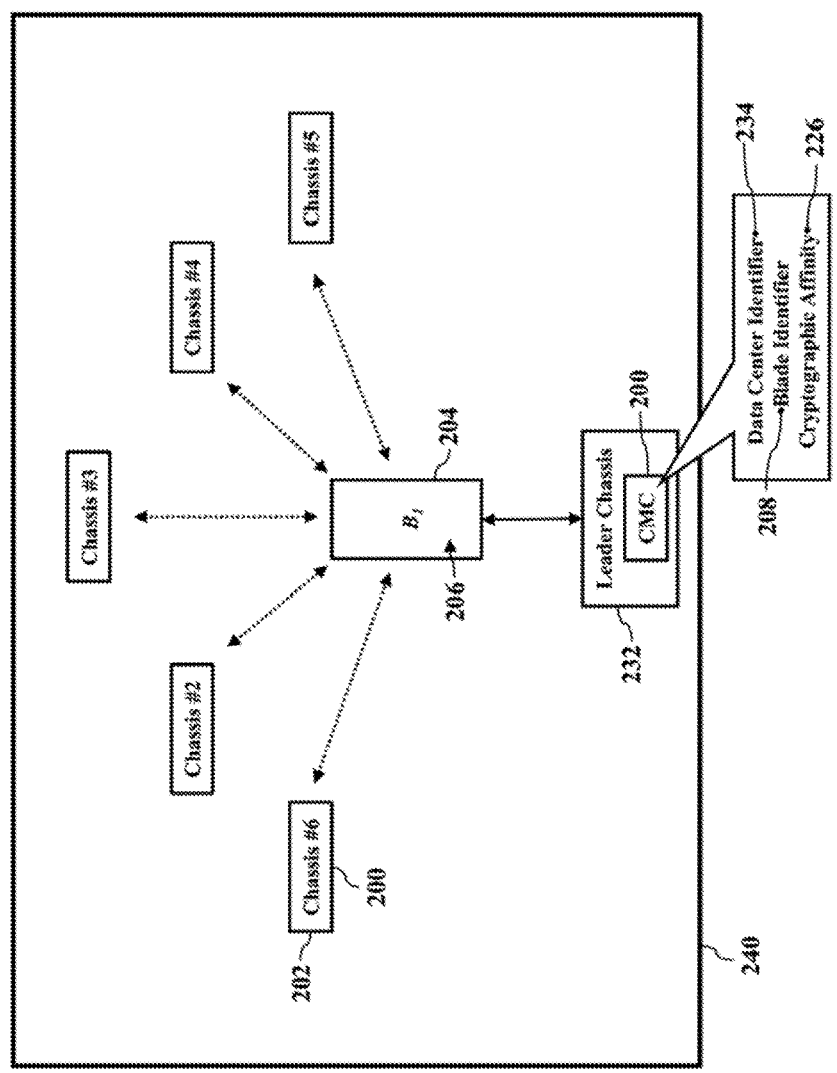

FIG. 6 illustrates a data center affinity. Here the blade server 204 may be have the cryptographic affinity 226 to a data center 240. That is, the blade server 204 may be cryptographically keyed to any chassis 202 installed within the data center 240. The chassis management controller 200 retrieves a data center identifier 242 associated with the data center 240. The data center identifier 242 is an alphanumeric combination that uniquely identifies the data center 240. The chassis management controller 200 may then hash the blade identifier 208 and the data center identifier 242 to generate the cryptographic affinity 226. Whenever the blade server 204 operates, exemplary embodiments may recalculate and check the cryptographic affinity 226. If the cryptographic affinity 226 matches, then the blade server 204 is installed within the correct data center 240. However, if the blade server 204 is installed within an unauthorized data center, then the cryptographic affinity 226 will not match and exemplary embodiments may deny access to the electronic data 206.

Exemplary embodiments protect the electronic data 206. Exemplary embodiments generate the cryptographic affinity 226 based on the chassis 202, the group 230 of chassis, and/or the data center 240. At any time, exemplary embodiments may calculate the cryptographic affinity 226 and compare to an initial, pre-approved, or master value(s). If the cryptographic affinity 226 matches, then the blade server 204 is installed within the authorized the chassis 202, the group 230 of chassis, and/or the data center 240. However, if the cryptographic affinity 226 fails to match an expected value, then exemplary embodiments may infer that the blade server 204 has been improperly or illegally installed in an unapproved location. Exemplary embodiments may lock out the blade server 204, thus preventing read, write, or other access operations.

Figure 7:
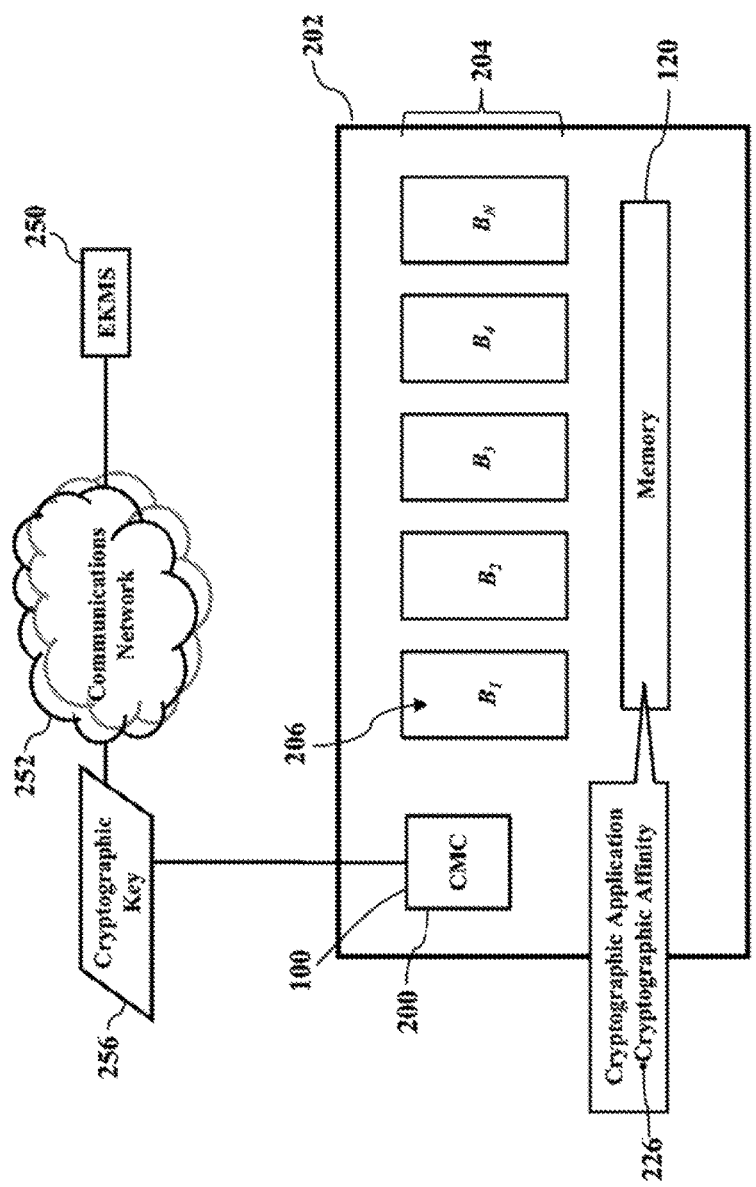
FIG. 7 is a more detailed illustration of a cryptographic affinity, according to exemplary embodiments.

FIG. 7 is a more detailed illustration of the cryptographic affinity 226, according to exemplary embodiments. Here again the information handling system 100 is illustrated as the chassis management controller 200. The chassis 202 houses several blade servers 204, as is common in an enterprise environment. The chassis management controller 200 interfaces with each one of the blade servers 204. The chassis management controller 200 may also interface with an enterprise key management server (or "EKMS") 250 via a communications network 252 (such as an enterprise network). The chassis management controller 200 executes a cryptographic application 254 stored in the memory 120. The cryptographic application 254 instructs the processors 102 and/or 104 (illustrated in FIG. 1) to generate the cryptographic affinity 226. The cryptographic application 254, for example, causes the chassis management controller 200 to query the enterprise key management server 250 for a single cryptographic key 256. The enterprise key management server 250 sends the single cryptographic key 256 as a query response. The cryptographic application 254 then instructs the chassis management controller 200 to store the single cryptographic key 256 in the memory 120.

Exemplary embodiments may then generate the cryptographic affinity 226. The cryptographic application 254 is an internal key management entity that creates keys for the populated blade slots within the chassis 202. For example, if the chassis 202 hosts sixteen (16) separate blade servers 204, then the cryptographic application 254 may create sixteen (16) different cryptographic affinities 226, with one cryptographic affinity 226 generated for each different blade server 204. The cryptographic application 254, in other words, may thus use the single cryptographic key 256 as a seed to create N more keys (where N is the number of blade servers 204 installed in the chassis 202). The cryptographic application 254 may distribute each cryptographic affinity 226 to the corresponding blade server 204.

Figure 8:
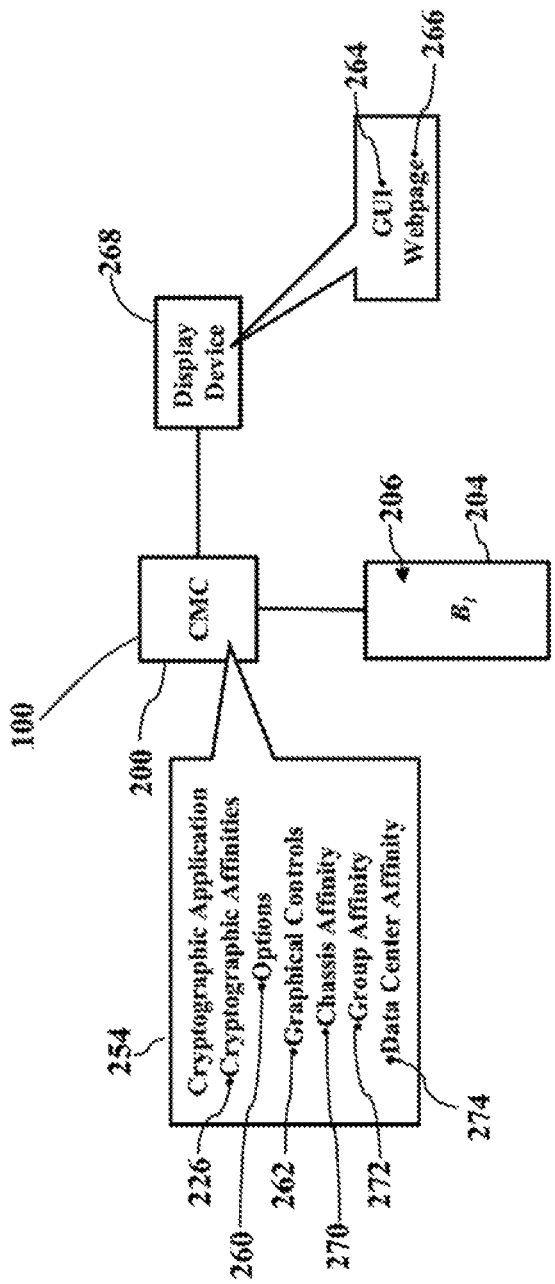
FIG. 8 illustrates affinity options, according to exemplary embodiments.

FIG. 8 illustrates affinity options, according to exemplary embodiments. A user of the cryptographic application 254 (such as an enterprise administrator or equipment vendor) may have selectable options 260 for different affinity strategies. For example, the cryptographic application 254 may generate graphical controls 262 displayed by a graphical user interface ("GUI") 264 or webpage 266 on a display device 268. One strategy, for example, may be a chassis affinity 270 that binds the blade server 204 to the hosting chassis 202. A group affinity 272 binds the blade server 204 to the group 230 of chassis. That is, in a multi chassis management system, the group affinity 272 allows the blade server 204 to be moved or reinstalled within a group boundary defining the group 230 of chassis. A data center affinity 274 binds the blade server 204 to the data center 240 (illustrated in FIG. 6), thus allowing the blade server 204 to be moved or reinstalled within a data center boundary defining any chassis operating within the data center 240. The blade server 204, in other words, may be installed in any networked chassis registered with the enterprise network 252.

Figure 9:
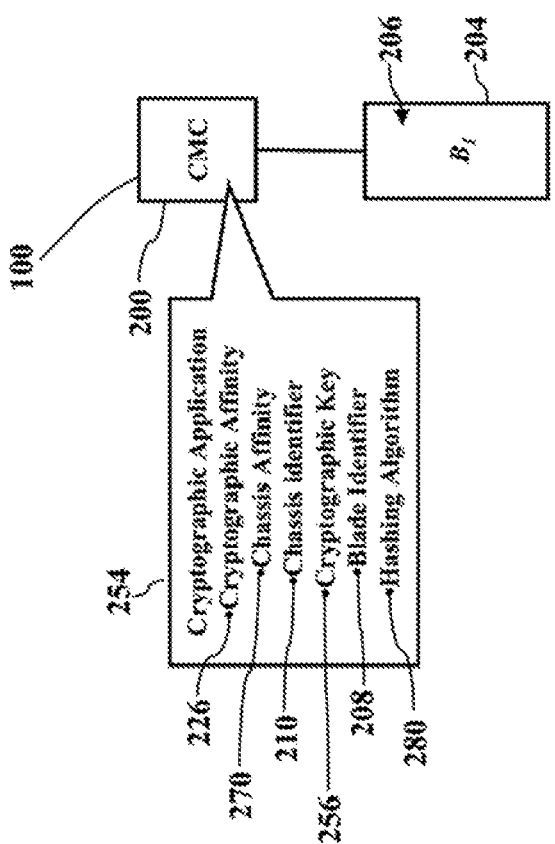
FIG. 9 illustrates a chassis affinity, according to exemplary embodiments.

FIG. 9 illustrates the chassis affinity 270, according to exemplary embodiments. In the chassis affinity 270 mode, the cryptographic affinity 226 may have a binding with the chassis 202 along with enterprise and blade bindings. For example, the cryptographic affinity 226 may be a blade key defined as $$bladekey(x)=Hash(EKMS\text{-}Key,Chassis\text{-}UUID,Blade\text{-}UUID(x)),$$

where the single cryptographic key 256 (received from the enterprise key management server 250) is hashed with the chassis identifier 210 and/or the blade identifier 208 using an electronic representation of a hashing algorithm 280. The chassis identifier 210 ("Chassis-UUID") thus binds the blade server 204 to the particular chassis 202. Exemplary embodiments may thus lock the blade server 204 via the chassis affinity 270. If the blade server 204 is moved to a new or different chassis, the chassis management controller 200 (controlling key management) cannot provide the key that the blade server 204 requires for access. To rekey, the cryptographic affinity 226 has to be recreated and the stored electronic data 206 will be erased. This is intended due to the chassis affinity 270 setting.

Figure 10:
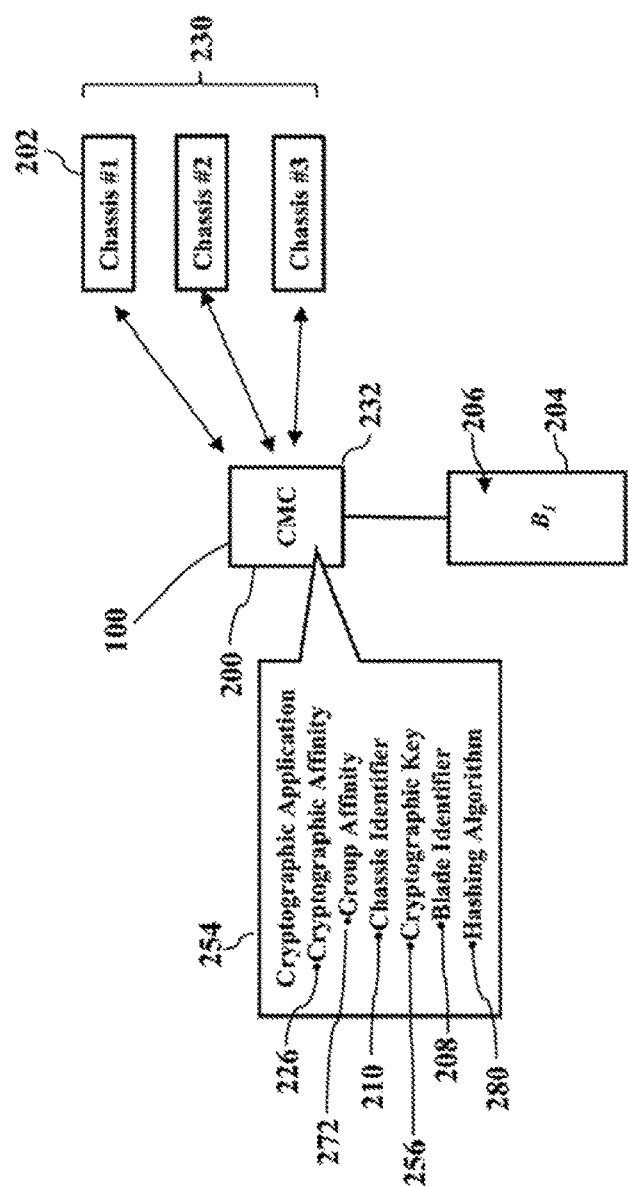
FIG. 10 illustrates a group affinity, according to exemplary embodiments.

FIG. 10 illustrates the group affinity 272, according to exemplary embodiments. In the group affinity 272 mode, the blade server 204 binds to the group 230 of chassis. That is, the cryptographic affinity 226 will have a binding with any member chassis 202 in the group 230 of chassis and/or the leader chassis 232. For example, the blade key may be defined as $$Bladekey(x)=Hash(Hash(EKMS\text{-}Key,Leader\ Chassis\text{-}UUID),Chassis\text{-}UUID,Blade\text{-}UUID(x)),$$

where the single cryptographic key 256 (received from the enterprise key management server 250) is first hashed with the chassis identifier 210 associated with the leader chassis 232. The hash result or value is then subsequently hashed with the chassis identifier 210 associated with the hosting chassis 202 and/or the blade identifier 208 using the hashing algorithm 280. Exemplary embodiments may thus cryptographically lock the blade server 204 to the group 230 of chassis via the group affinity 272. If the blade server 204 is moved to a new group, the new group cannot provide the key that the blade server 204 requires for operation.

Figure 11:
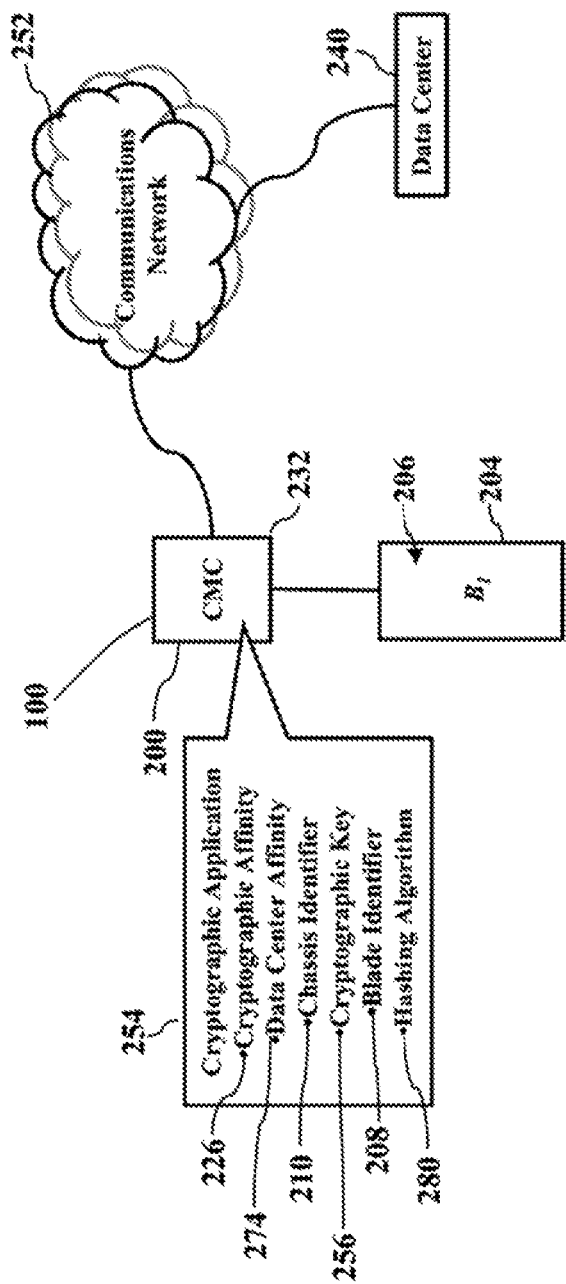
FIG. 11 illustrates a data center affinity, according to exemplary embodiments.

FIG. 11 illustrates the data center affinity 274, according to exemplary embodiments. In the data center affinity 274 mode, the blade server 204 binds to the data center 240 and/or the enterprise network 252. That is, the cryptographic affinity 226 will have a binding with the enterprise and blade server 204. For example, the blade key may be defined as $$Bladekey(x)=Hash(EKMS\text{-}Key,Blade\text{-}UUID(x)),$$

where the single cryptographic key 256 (received from the enterprise key management server 250) is hashed with the blade identifier 208 using the hashing algorithm 280. If the blade server 204 is locked with the data center affinity 274 and moved to a new chassis, the chassis management controller 200 will be able to provide the key that the blade server 204 requires.

Figure 12:
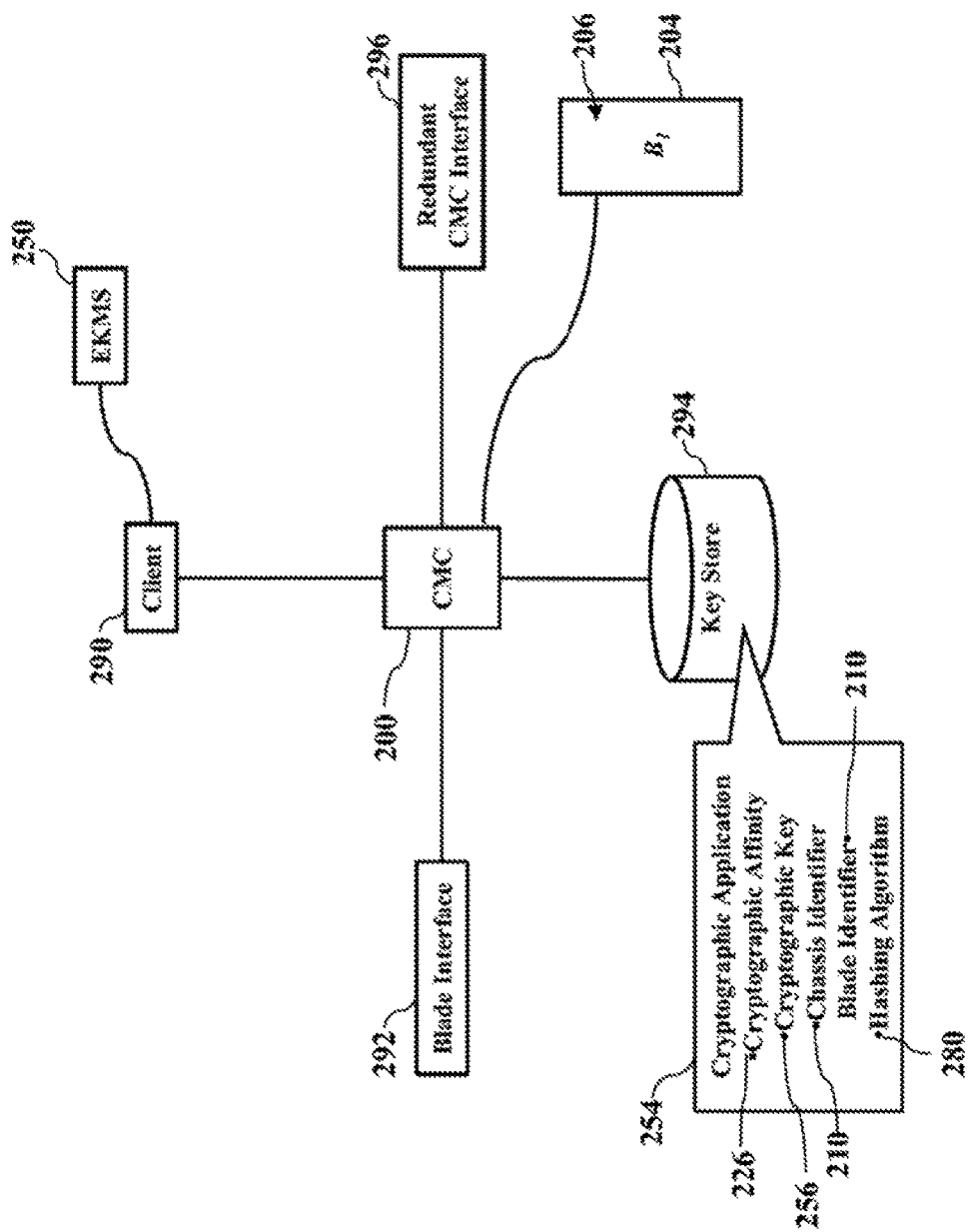
FIG. 12 is a functional block diagram illustrating key management, according to exemplary embodiments.

FIG. 12 is a functional block diagram illustrating key management, according to exemplary embodiments. Here the chassis management controller 200 manages the one or more cryptographic affinities 226. The chassis management controller 200 has a client interface 290 to the enterprise key management server (or "EKMS") 250. To retrieve the single cryptographic key 256, the cryptographic application 254 presents the chassis identifier 210 as the data key hash for the enterprise key management server 250. The enterprise key management server 250 creates only one key (e.g., the single cryptographic key 256) corresponding to the chassis identifier 210 and sends the single cryptographic key 256 back to the chassis management controller 200. A blade interface 292 is used to retrieve the blade identifier 208 and to provide the cryptographic affinity 226 to the blade server 204. The cryptographic application 254 is the main engine (e.g., the processors 102 and 104 and the memory 120 illustrated in FIG. 1) that creates the blade specific keys and stores them in a key store 294 (an internal electronic database). If an interface 296 to a redundant chassis management controller is present, the key store 294 will be shared with the redundant chassis management controller using internal CMC communication channels.

Key management may be invoked. When the blade server 204 is added to the single chassis 202, the chassis management controller 200 will detect the new blade insertion. When the blade server 204 boots up, the service processor in the blade server 204 will query the chassis management controller 200 for a new key and presents its blade identifier 208. The blade server's service processor will also specify what binding is required (such as the chassis affinity 270, the group affinity 272, and/or the data center affinity 274). Once the chassis management controller 200 receives the specified binding request, the chassis management controller 200 creates the cryptographic affinity 226 (e.g., the blade key above defined) and provides the cryptographic affinity 226 to the blade server's service processor. The cryptographic affinity 226 stores the blade identifier 208 in the key store 294 in electronic association with any information, such as the blade identifier 208, the chassis identifier 210, and/or other binding details. The cryptographic affinity 226 may be unavailable for retrieval until the chassis management controller 200 receives the single cryptographic key 256 from the enterprise key management server 250. For the blade server's service processor, the enterprise key management server 250 may be abstracted. For the blade server 204, it merely requests a key and receives a key.

Key management may also be invoked when adding blade servers to a multi-chassis environment. In a multi-chassis environment, the leader chassis 232 becomes the key management endpoint for its member chassis nodes. The blade servers 204 in any member chassis will request a key from their local chassis management controller 200. With propagated MCM properties, the member CMC is configured to use the leader CMC as the enterprise key management server 250. The member chassis receives the group key from the leader chassis 232 which it will use to create the member level keys.

Key management may also include removal. If a blade server 204 is removed, the key metadata may remain with the key store 294 until such time that an administrator manually removes the keys. A timer may also be implemented to automatically delete keys as well.

Keys may be generated. When an administrator or technician inserts the blade server 204 into the chassis 202, the administrator or technician may configure the enterprise key management server 250 and/or the chassis management controller 200 to indicate the desired cryptographic affinity 226 (such as the chassis affinity 270, the group affinity 272, and/or the data center affinity 274). The cryptographic application 254 may then instruct a baseboard management controller to sent a GetNewKey command to the chassis management controller 200. The chassis management controller 200 inspects the desired cryptographic affinity 226, generates the keys, and sends the single cryptographic key 256 and a CMC identifier (such as the chassis identifier 210) back to the baseboard management controller. The baseboard management controller will store the CMC identifier.

Once the blade server 204 is keyed, removal may be permitted. If the blade server 204 is removed from one chassis and plugged into another chassis, the blade server's service processor will send a GetExistingKey command to the chassis management controller 200 along with the blade identifier 208 and the current chassis identifier 210. If the chassis affinity 270 is turned on, then the chassis management controller 200 will not be able to give the key to the blade server 204 and the blade server 204 must be rekeyed. For the data center affinity 274, the chassis management controller 200, upon receiving the chassis identifier 210 and the blade identifier 208, will get the key from the EKMS based on the chassis identifier 210 and create the unlocking key. The blade server 204 has to be rekeyed to the new chassis. If the group affinity 272 is turned on, then the keys will be available to the blade server 204 as long as it is moved within the group 230 of chassis.

Rekeying may also be permitted. To request a new locking key for the blade server 204, the service processor should be able to get the existing locking key. If the keys are retrieved successfully the service processor will send a ReKey command to the chassis management controller 200 with the old identifiers and get a new locking key. This procedure may be required for movement from one chassis to another.

Exemplary embodiments present a faster solution. Because the chassis management controller 200 manages the keys, the blade server 204 has faster access to the keys than repeated retrieval from the remote EKMS. When multiple blades require multiple keys, the ultimate end point for the keys is the chassis management controller 200. A chassis subsystem may have a requirement for a larger number of keys. Exemplary embodiments thus drastically reduce the number of requests going out of the system to the EKMS. The boot time of the blade server 204 will be improved as communication with the EKMS 250 is unneeded; instead, the blade server 204 need only talk with the chassis management controller 200 on a local network or bus (such as a vLAN).

Exemplary embodiments also improve security. If communication with the EKMS is lost, the required keys still remain in the key store 294 until electrical power is provided. If the chassis 202 powered off and stolen, the chassis management controller 200 loses the single cryptographic key 256 from the EKMS 250 and will not allow access to the key store 294 until the single cryptographic key 256 is obtained.

Exemplary embodiments also reduce complexity. Exemplary embodiments substantially reduce the number of keys required from the EKMS 250. Some commercially available key management servers charge money for each key set, which increases costs with volume. Exemplary embodiments, instead, emulate the whole chassis as a monolithic node.

Exemplary embodiments may packetize. Exemplary embodiments may interface with the enterprise network 252, a local area network, and/or a wide area network (such as the Internet). Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of cryptographic security, comprising:
receiving, by an information handling system, a blade identifier that uniquely identifies a blade server installed in a chassis;
retrieving, by the information handling system, a chassis identifier that uniquely identifies the chassis;
hashing, by the information handling system, the blade identifier and the chassis identifier using an electronic representation of a hashing algorithm to generate a cryptographic affinity that uniquely identifies the blade server installed in the chassis;
comparing the cryptographic affinity to a previously generated value; and
permitting a read/write access to electronic data stored by the blade server in response to the cryptographic affinity matching the previously generated value.

2. The method of claim 1, further comprising storing the cryptographic affinity in an electronic database.

3. The method of claim 1, further comprising storing the cryptographic affinity in the electronic database, the electronic database electronically associating the cryptographic affinity and the blade identifier.

4. The method of claim 1, further comprising storing the cryptographic affinity in the electronic database, the electronic database electronically associating the cryptographic affinity and the chassis identifier.

5. The method of claim 1, further comprising storing the cryptographic affinity in an electronic database, the electronic database electronically associating the cryptographic affinity to the blade identifier and to the chassis identifier.

6. An apparatus, comprising:
a hardware processor; and
a memory device, the memory device storing instructions, the instructions when executed causing the hardware processor to perform operations including:
receiving a blade identifier sent from a blade server installed in a chassis the blade identifier uniquely identifying the blade server;
retrieving a chassis identifier that uniquely identities the chassis having the blade server installed therein;
hashing the blade identifier and the chassis identifier using an electronic representation of a hashing algorithm to generate a cryptographic affinity that uniquely identifies the blade server installed in the chassis;
comparing the cryptographic affinity to a previously generated value; and
permitting a read/write access to electronic data stored by the blade server in response to the cryptographic affinity matching the previously generated value.

7. The system of claim 6, wherein the operations further comprise storing the cryptographic affinity in an electronic database.

8. The system of claim 6, wherein the operations further comprise storing the cryptographic affinity in the electronic database, the electronic database electronically associating the cryptographic affinity and the blade identifier.

9. The system of claim 6, wherein the operations further comprise storing the cryptographic affinity in the electronic database, the electronic database electronically associating the cryptographic affinity and the chassis identifier.

10. The system of claim 6, wherein the operations further comprise storing the cryptographic affinity in the electronic database, the electronic database electronically associating the cryptographic affinity to the blade identifier and to the chassis identifier.

11. The system of claim 6, wherein the operations further comprise receiving a request for the read/write access to the electronic data stored by the blade server.

12. A memory device storing instructions that when executed cause a hardware processor to perform operations, the operations comprising:
 receiving a blade identifier sent from a blade server installed in a chassis, the blade identifier uniquely identifying the blade server;
 retrieving a chassis identifier that uniquely identifies the chassis having the blade server installed therein;
 hashing the blade identifier and the chassis identifier using an electronic representation of a hashing algorithm to generate a cryptographic affinity that uniquely identifies the blade server installed in the chassis;
 comparing the cryptographic affinity to a previously generated value; and
 permitting read/write access to electronic data stored by the blade server in response to the cryptographic affinity matching the previously generated value.

13. The memory device of claim 12, wherein the operations further comprise denying access to the blade server based on the cryptographic affinity.

14. The memory device of claim 12, wherein the operations further comprise denying a read operation from the blade server based on the cryptographic affinity.

15. The memory device of claim 12, wherein the operations further comprise denying a write operation to the blade server based on the cryptographic affinity.

16. The memory device of claim 12, wherein the operations further comprise deleting the electronic data stored to the blade server based on the cryptographic affinity.

17. The memory device of claim 15, wherein the operations further comprise generating the cryptographic affinity in response to the hashing of the blade identifier with a group identifier associated with a group of chassis.

* * * * *